(12) United States Patent
Tinnakornsrisuphap

(10) Patent No.: US 9,948,534 B2
(45) Date of Patent: Apr. 17, 2018

(54) ACCESS POINT RESOURCE CONSUMPTION MANAGEMENT

(71) Applicant: QUALCOMM Incorporated, San Diego, CA (US)

(72) Inventor: Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 15/131,122

(22) Filed: Apr. 18, 2016

(65) Prior Publication Data

US 2017/0187595 A1 Jun. 29, 2017

Related U.S. Application Data

(60) Provisional application No. 62/271,703, filed on Dec. 28, 2015.

(51) Int. Cl.
| | | |
|---|---|---|
| *H04W 88/10* | (2009.01) | |
| *H04L 12/26* | (2006.01) | |
| *H04W 72/04* | (2009.01) | |
| *H04W 52/02* | (2009.01) | |
| *H04W 24/02* | (2009.01) | |

(Continued)

(52) U.S. Cl.
CPC .......... *H04L 43/0876* (2013.01); *H04L 43/16* (2013.01); *H04W 24/02* (2013.01); *H04W 36/14* (2013.01); *H04W 36/165* (2013.01); *H04W 52/0206* (2013.01); *H04W 52/0235* (2013.01);
(Continued)

(58) Field of Classification Search
CPC ... H04W 24/02; H04W 36/14; H04W 36/165; H04W 36/08; H04W 52/0206; H04W 52/0235; H04W 52/0229; H04W 52/0212; H04W 72/048; H04W 88/10; H04W 80/04; H04W 76/045; H04W 4/00; H04W 4/005; H04W 28/0215; H04W 16/08;
(Continued)

(56) References Cited

U.S. PATENT DOCUMENTS

| 8,175,661 B2 | 5/2012 | Park et al. |
| 8,374,192 B2 | 2/2013 | Surineni et al. |

(Continued)

FOREIGN PATENT DOCUMENTS

EP 2800424 A1 11/2014

OTHER PUBLICATIONS

International Search Report and Written Opinion—PCT/US2016/063090—ISA/EPO—dated Feb. 24, 2014.

*Primary Examiner* — Le H Luu
(74) *Attorney, Agent, or Firm* — The Marbury Law Group/Qualcomm

(57) ABSTRACT

Embodiments include systems and methods for managing resource consumption by a processor of a wireless access point. The processor may monitor associations and dissociations of one or more client devices with the access point, and may monitor a network load of the access point. The processor may determine whether the network load is below a load threshold, and may determine radio capabilities of one or more client devices associated with the access point. The processor may select a radio of the access point based on the determined radio capabilities of one or more client devices associated with the access point, and may place the selected radio of the access point in a low-power mode.

50 Claims, 7 Drawing Sheets

(51) Int. Cl.
*H04W 36/14* (2009.01)
*H04W 36/16* (2009.01)

(52) U.S. Cl.
CPC ......... *H04W 72/048* (2013.01); *H04W 88/10* (2013.01)

(58) Field of Classification Search
CPC ..... H04L 43/0876; H04L 43/16; H04L 7/041; H04L 1/0001; H04B 7/026
See application file for complete search history.

(56) References Cited

U.S. PATENT DOCUMENTS

| | | | |
|---|---|---|---|
| 8,411,606 B2 | 4/2013 | Chen et al. | |
| 8,526,346 B1 | 9/2013 | Liu | |
| 8,699,456 B2* | 4/2014 | Smadi | H04W 36/08 370/331 |
| 9,066,197 B2 | 6/2015 | Kiukkonen et al. | |
| 2009/0298515 A1* | 12/2009 | Czaja | H04L 7/041 455/456.5 |
| 2010/0085884 A1* | 4/2010 | Srinivasan | H04W 16/08 370/252 |
| 2011/0090939 A1* | 4/2011 | Diener | H04L 1/0001 375/136 |
| 2013/0094371 A1* | 4/2013 | Vallath | H04W 76/045 370/252 |
| 2013/0159478 A1* | 6/2013 | Rousu | H04W 52/0229 709/221 |
| 2013/0235726 A1 | 9/2013 | Frederiksen et al. | |
| 2013/0293419 A1* | 11/2013 | Negus | H04W 4/00 342/371 |
| 2014/0016614 A1* | 1/2014 | Velev | H04W 4/005 370/331 |
| 2014/0051446 A1 | 2/2014 | Rose et al. | |
| 2014/0187234 A1 | 7/2014 | Chou | |
| 2014/0369201 A1* | 12/2014 | Gupta | H04W 28/0215 370/235 |
| 2015/0106530 A1* | 4/2015 | Alanen | H04W 80/04 709/231 |
| 2015/0223192 A1* | 8/2015 | Cao | H04W 52/0212 370/252 |
| 2015/0263835 A1* | 9/2015 | Shattil | H04B 7/026 370/329 |

* cited by examiner

ACCESS POINT RESOURCE CONSUMPTION MANAGEMENT

RELATED APPLICATIONS

This application claims the benefit of priority to U.S. Provisional Patent Application No. 62/271,703 entitled "Access Point Resource Consumption Management" filed Dec. 28, 2015, assigned to the assignee hereof, the entire contents of which are hereby incorporated by reference.

BACKGROUND

Wireless networks are widely deployed, especially for use in relatively well-defined areas such as residences, workplaces, and certain public venues. A wireless access point (sometimes referred to as an "AP") can be connected to a cable modem or digital subscriber line (DSL) modem to provide wireless access to a broadband network. A wireless client (e.g., a smart phone, a tablet, a laptop, or another similar device) may establish a communication link ("associate") with an access point, either directly or through a range extender device.

To increase available bandwidth, access points are configured with an increasing number of radios capable of transmitting and receiving signals in a variety of frequency bands. For example, a three-radio access point may be configured to support simultaneous operation on three channels. Three-radio operation may be enabled by communication protocols such as Institute of Electrical and Electronic Engineers (IEEE) 802.11ac. IEEE 802.11ac provides for multi-user multiple-input multiple-output (MU-MIMO) operation, which supports simultaneous communication from the access point to multiple clients. MU-MIMO operation may thus substantially improve communication with the access point.

However, each additional radio consumes an increasing amount of power and processing resources of the access point. Further, transmission and reception of signals by each radio may generate interference with other signals from other devices. Moreover, the additional radios raise issues of regulatory conformance with power consumption and signal emission regulations in various jurisdictions.

SUMMARY

Various embodiments and implementations include methods and wireless access points implementing methods for managing resource consumption. Various embodiments and implementations may include monitoring associations and dissociations of one or more client devices with an access point, monitoring a network load of the access point, determining whether the network load is below a load threshold, determining radio capabilities of one or more client devices associated with the access point when the network load is below the load threshold, selecting a radio of the access point based on the determined radio capabilities of one or more client devices associated with the access point, and placing the selected radio of the access point in a low-power mode.

Some implementations may further include determining whether a number of client devices associated with the access point is below a client threshold in response to determining that the network load is below the load threshold, and determining radio capabilities of the one or more client devices associated with the access point when the number of client devices associated with the access point is below the client threshold.

In some implementations, determining whether a number of client devices associated with the access point is below a client threshold may include determining whether a number of client devices associated with a radio of the access point is below a client threshold, and selecting a radio of the access point based on the determined radio capabilities of one or more client devices associated with the access point may include selecting a radio of the access point based on the determined radio capabilities of one or more client devices associated with the access point when the number of client devices associated with the radio of the access point is below the client threshold.

Some implementations may further include determining whether a priority client has dissociated from the access point in response to determining that the number of client devices associated with the access point is below the client threshold, and determining radio capabilities of the one or more client devices associated with the access point in response to determining that the priority client has dissociated from the access point. Some implementations may further include identifying the one or more client devices associated with the access point, and selecting a radio of the access point based on the determined radio capabilities of the one or more client devices associated with the access point may include selecting the radio of the access point based on an identity of the one or more identified client devices associated with the access point.

Some implementations may further include generating historical information based on the monitored associations and dissociations of the one or more client devices with the access point, and selecting a radio of the access point based on the determined radio capabilities of the one or more client devices associated with the access point may include selecting the radio of the access point based on the generated historical information of the one or more client devices. In some implementations, the generated historical information may include a portion of the network load attributable to the one or more client devices associated with the access point, and selecting a radio of the access point based on the determined radio capabilities of the one or more client devices associated with the access point may include selecting the radio of the access point based on the network load attributable to each of the one or more client devices associated with the access point.

In some implementations, selecting the radio of the access point based on the generated historical information of the one or more client devices may include selecting the radio of the access point based on one or more client devices expected to associate with the access point. In some implementations, selecting the radio of the access point based on one or more client devices expected to associate with the access point may include selecting the radio of the access point based on radio capabilities of the one or more client devices expected to associate with the access point. Some implementations may further include re-associating one or more associated client devices using the selected radio of the access point with a different radio of the access point. In some implementations, placing the selected radio of the access point in the low-power mode may include turning off the selected radio of the access point.

Some implementations may further include determining whether the network load is above the load threshold, determining radio capabilities of the one or more client devices associated with the access point when the network load is above the load threshold, selecting a radio of the access point based on the determined radio capabilities of the one or more client devices associated with the access point, and placing the selected radio of the access point in an active mode. In some implementations, selecting a radio of the access point based on the determined radio capabilities of the one or more client devices associated with the access point may include selecting the radio of the access point based on the determined radio capabilities of one or more client devices expected to associate with the access point.

Some implementations may further include determining whether a number of client devices associated with the access point is above a client threshold in response to determining that the network load is not above the load threshold, and determining the radio capabilities of the one or more client devices associated with the access point when the number of client devices associated with the access point is above the client threshold. Some implementations may further include determining whether the access point has received an association request from a priority client in response to determining that the number of client devices associated with the access point is not above the client threshold, and determining the radio capabilities of the one or more client devices associated with the access point in response to determining that the access point has received the association request from the priority client. Some implementations may further include associating one or more associated client devices with the radio placed in the active mode. In some implementations, determining radio capabilities of one or more client devices associated with the access point when the network load is below the load threshold may include determining the radio capabilities of the one or more client devices based on information in a message received from the one or more client devices.

Further embodiments include a wireless access point having one or more radios and a processor coupled to the radios and configured to perform operations of the methods summarized above. Further embodiments include a wireless access point having one or more radios and means for performing functions of the methods summarized above. Further embodiments include a non-transitory processor-readable storage medium on which is stored processor-executable instructions configured to cause a processor of a multimode communication device to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
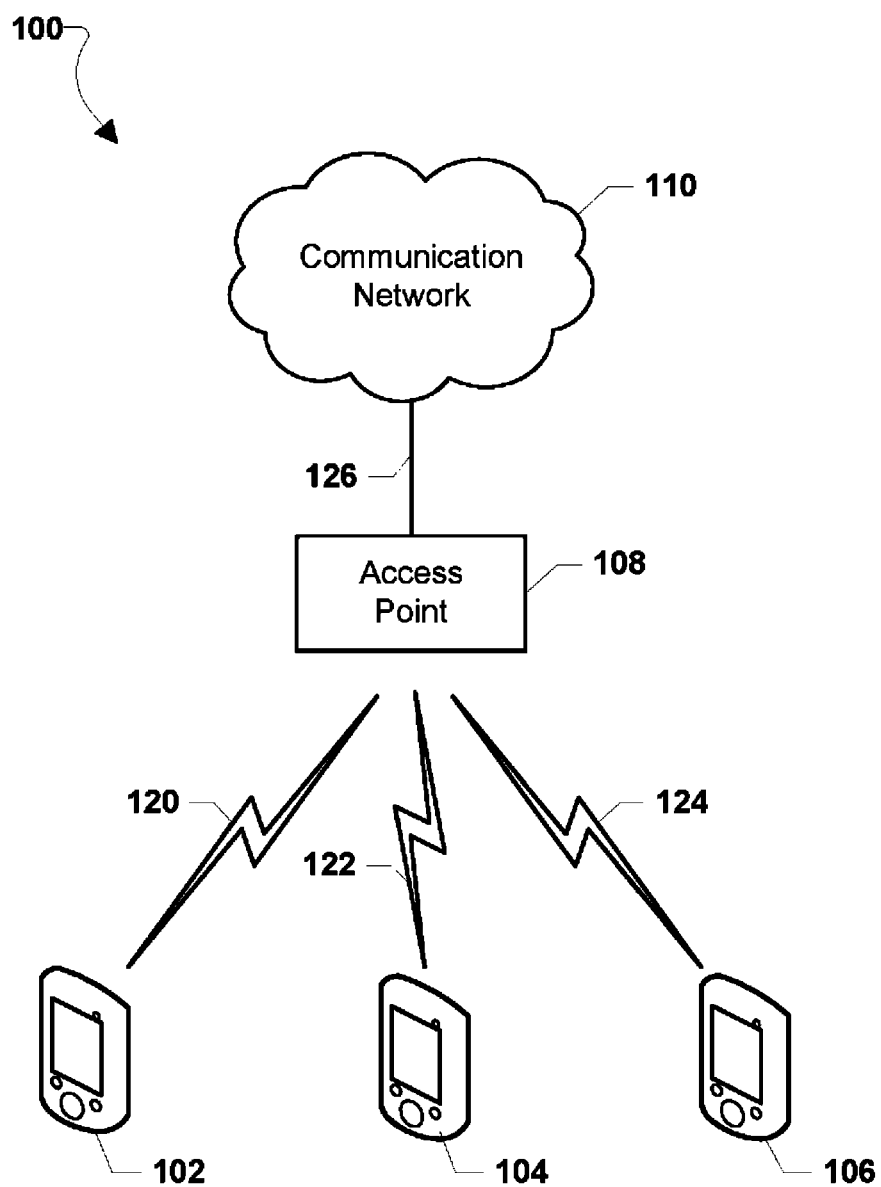
FIG. 1 is a communication system block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

Various embodiments provide methods for managing resource consumption by a wireless access point based on a network load of the access point and the number and radio capabilities of client devices that are associated with the access point.

The term "client" is used herein to refer to a device that may associate with an access point, and includes any one or all of a cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

The term "access point" is used herein to refer to a client device that may provide one or more client devices with a wireless communication link to a network connection via one or more radios, and includes wireless routers, range extenders, hotspot devices, and other similar devices. Thus, access points support a wireless communication link to client devices via radios and include circuitry for relaying network message traffic both directions between the wireless communication link and another network, such as a network connection to an Internet service provider (ISP) or a wired local area network.

The terms "component," "system," "unit," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Wireless access points may be configured with a plurality of radios capable of transmitting and receiving signals in a variety of frequency bands. For example, a three-radio access point may be configured to support simultaneous operation on three channels. Such access points may also be configured to use one or more communication protocols that support simultaneous multi-channel communications, such as 802.11ac, which provides for MU-MIMO operation. However, each additional radio consumes an increasing amount of power and processing resources of the access point, and may generate interference with other signals from other devices.

Various embodiments provide methods implemented by a processor of a wireless access point to manage resource consumption by the access point. The access point processor may monitor associations and disassociations of one or more client devices to and from the access point. The access point processor may also monitor a network load of the access point caused by one or more associated client devices. The network load can include, for example, and aggregate throughput of data through the access point, an amount of time occupied by data traffic (for example, as a percentage of data carriage capacity), an amount of time that one or more radios of the access point are receiving or transmitting a signal, or another network load metric.

The access point processor may determine the radio capabilities of one or more client devices associated with the access point. For example, while an access point may include three radios (e.g., a 2.4 GHz radio, a lower band 5 GHz radio, and a higher band 5 GHz radio), certain client devices may only support communications with one or two of the channel/carriers supported by the access point.

A processor of the access point may determine whether the monitored network load is below a load threshold. In some embodiments, the access point processor may determine whether the monitored load network of a particular radio is below the load threshold. When the network load on the access point is below a load threshold and the number of clients associated with the access point is below a number threshold, the access point processor may select one of the radios of the access point based on the determined radio capabilities of one or more client devices associated with the access point, and the access point processor may place the selected radio in a low-power mode, which may involve turning off (i.e., powering down) the selected radio of the access point.

In some embodiments, the processor of an access point may determine whether a number of client devices associated with the access point is below client threshold. In response to determining that the number of client devices associated with the access point is below the client threshold, the access point processor may determine the radio capabilities of the one or more client devices associated with the access point and select a radio of the access point based on the determined radio capabilities of the one or more client devices. In some embodiments, the access point processor may determine whether a priority client has dissociated from the access point, and in response to determining that the priority client has dissociated from the access point, the access point processor may determine the radio capabilities of the one or more client devices associated with the access point and select a radio of the access point based on the determined radio capabilities of the one or more client devices.

In some embodiments, based on the monitored associations and dissociations of one or more client devices over time, the access point processor may generate and store historical information. Using the historical information, the access point processor may identify frequently associated client devices, and the access point processor may assign a higher priority to such frequently associated client devices. The historical information may also include times that certain frequent client devices associate with and/or dissociate from the access point, and using such information the access point processor may anticipate the association or dissociation of a client. In some embodiments, the access point processor may select the radio to be placed into the low-power mode based on the historical information.

In various embodiments, before the selected radio is placed into the low-power mode, the access point processor may re-associate one or more associated client devices that are using the selected radio with a different radio of the access point.

In various embodiments, the access point processor may also determine whether to activate (or reactivate) a radio that is in the low-power mode. For example, the access point processor may determine whether the network load is above the load threshold, may determine radio capabilities of the one or more client devices associated with the access point, and may select to radio the access point to place into an active mode based on the determined radio capabilities of the one or more associated client devices. In some embodiments, the access point processor may select the radio based on radio capabilities of one or more client devices expected to associate with the access point. In some embodiments, the access point processor may select the radio based on the reception of an association request from a particular client, such as a priority client. In some embodiments, the access point processor may determine the radio capabilities of the one or more associated client devices in response to determining that the number of associated client devices is above a client threshold.

Various embodiments may be implemented in access points that may operate within a variety of communication systems. FIG. 1 illustrates a communication system 100 suitable for use with various embodiments. Client devices 102, 104, 106 may communicate with an access point 108 through communication links 120, 122, and 124, respectively. The access point 108 may communicate with a communication network 110 over a wired or wireless communication link 126, which may include twisted-pair backhaul links, fiber optic backhaul links, microwave backhaul links, and other similar communication links. In some embodiments, access point 108 may include a first access point and a second access point. For example, a first access point may communicate with the communication network 110, and a second access point may communicate with the first access point via a wired or wireless communication link. The second access point may also communicate with one or more client devices (e.g., the client devices 102, 104, 106), and thus the second access point may act as a range extender in communication with the first access point.

While the communication links 120, 122, 124 are illustrated as single links, each of the communication links 120, 122, 124 may include a plurality of carrier signals, frequencies, or frequency bands, each of which may include a plurality of logical channels. Additionally, each of the communication links 120, 122, 124 may utilize more than one radio access technology (RAT). In some embodiments, the communication links 120, 122, 124 may using a wireless communication protocol such as a RAT in the IEEE 802 family (including Wi-Fi, ZigBee, Bluetooth, and others). The communication links 120, 122, 124 may include cellular communication links using 3GPP Long Term Evolution (LTE), Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies. Additionally, each of the communication links 120, 122, 124 may utilize more than one radio access technology.

Figure 2A:
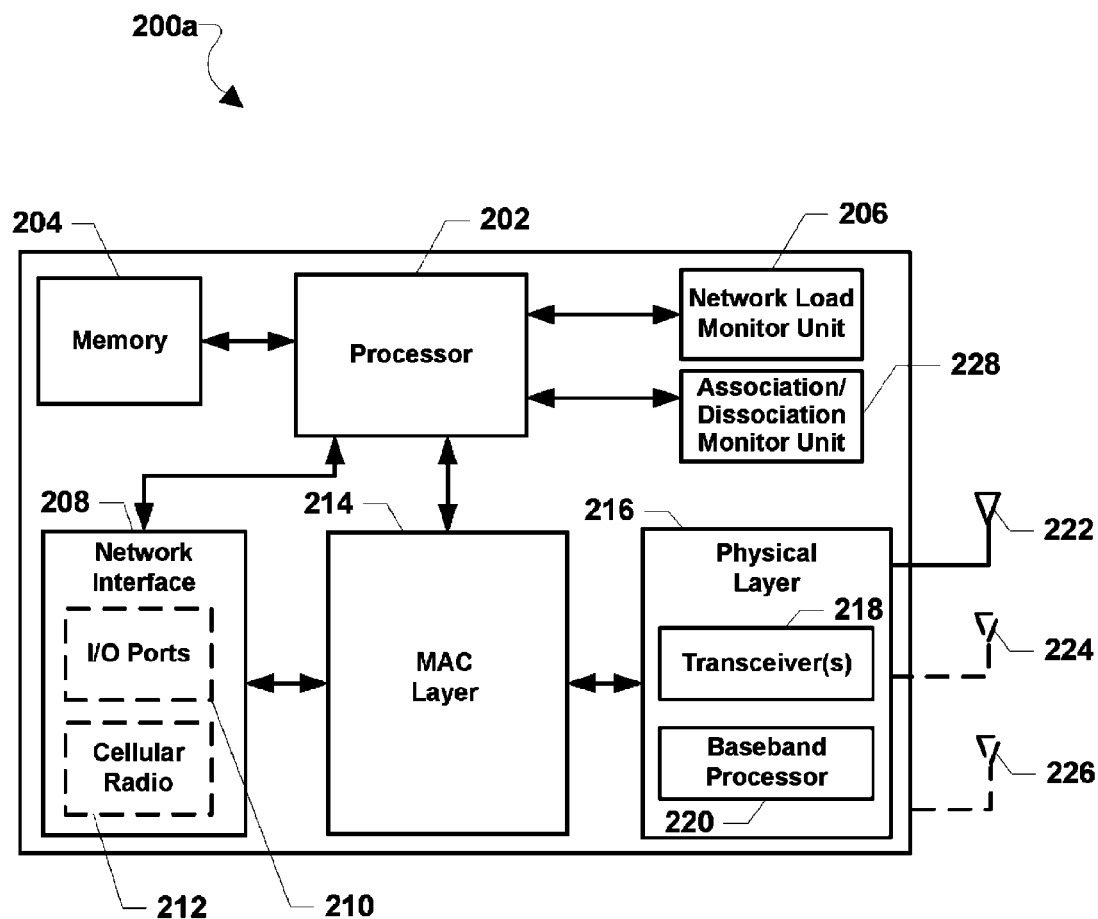
FIGS. 2A and 2B are component block diagrams illustrating access points suitable for use with various embodiments.

FIG. 2A is a component block diagram of an example of a wireless access point 200a suitable for implementing various embodiments. With reference to FIGS. 1 and 2A, in various embodiments, the access point 200a may be similar to the access point 108.

The access point 200a may include at least one controller, such as a processor 202. The processor 202 may be a processor configurable with processor-executable instructions to execute operations of the various embodiments, a specialized processor, such as a modem processor, configurable with processor-executable instructions to execute operations of the various embodiments in addition to a primary function, a dedicated hardware (i.e., "firmware") circuit configured to perform operations of the various embodiments, or a combination of dedicated hardware/firmware and a programmable processor.

The processor 202 may be coupled to memory 204, which may be a non-transitory computer-readable storage medium that stores processor-executable instructions. The memory 204 may store an operating system, as well as user application software and executable instructions. The memory 204 may also store application data, such as an array data structure. The memory 204 may include one or more caches, read only memory (ROM), random access memory (RAM), electrically erasable programmable ROM (EEPROM), static RAM (SRAM), dynamic RAM (DRAM), or other types of memory. The processor 202 may read and write information to and from the memory 204. The memory 204 may also store instructions associated with one or more protocol stacks. A protocol stack generally includes computer executable instructions to enable communication using a radio access protocol or communication protocol.

The processor 202 may also be coupled to a network load monitor unit 206, and an association/dissociation monitor unit 228. In some embodiments, the network load monitor unit 206 may use information from the physical layer 216, a medium access control (MAC) layer 214, and/or the processor 202 to determine a network load of the access point caused by one or more associated client devices (e.g., the client devices 102, 104, 106). In some embodiments, the network load monitor unit 206 may receive information from the physical layer 216 and/or the MAC layer 214 and provide such information to the processor 202 for determination of the network load.

In some embodiments, the association/dissociation monitor unit 228 may use information from the physical layer 216, the MAC layer 214 and/or the processor 202 to determine a number and/or identity of client devices that associate with or dissociate from the access point 200a. In some embodiments, the association/dissociation monitor unit 228 may receive information from the physical layer 216 and/or the MAC layer 214 and provide such information to the processor 202 for determination of the number and/or identity of client devices that associate with or dissociate from the access point 200a. The network load monitor unit 206, the association/dissociation monitor unit 228, and/or the processor 202 may store information related to the network load and client associations and dissociations in the memory 204.

The access point 200a may also include a network interface 208 for connecting to a broadband network, such as the Internet. The access point 200a may provide various computing devices with access the broadband network. The network interface 208 may include one or more input/output (I/O) ports 210 through which a connection to a network may be provided. For example, the I/O ports 210 may include an Ethernet connection, a fiber optic connection, a broadband cable connection, a telephone line connection, or other types of wired communication connections. Alternatively or in addition to the I/O ports 210, the network interface 208 may include a cellular radio unit 212 that provides a connection to a mobile telephony system or cellular data network through which access to the Internet may be acquired.

The processor 202 may be coupled to the MAC layer 214. The MAC layer 214 may provide addressing and channel access control mechanisms between the network interface 208 and one or more devices associated with the access point 200a, such as wireless client devices and/or range extenders. The MAC layer 214 may be connected to a physical layer 216, which may perform various encoding, signaling, and data transmission and reception functions. The physical layer 216 may include one or more transceivers 218 and a baseband processor 220 for carrying out the various functions of the physical layer 216. The physical layer 216 may be coupled to one or more wireless antennas (e.g., wireless antennas 222, 224, and 226) to support wireless communications with devices associated with the access point 200a, such as wireless client devices and/or range extenders. Each of the transceivers 218 may be configured to provide communications using one or more frequency bands. Such frequency bands may include, for example, 2.4 GHz, lower band 5 GHz, and higher band 5 GHz. Additional examples include 900 MHz (e.g., as may be described with reference to IEEE 802.11ah), 60 GHz (e.g., as may be described with reference to IEEE 802.11ad), and "TV whitespace" frequency bands between 54 and 790 MHz (e.g., so-called "White-Fi" or "Super Wi-Fi" bands, as may be described with reference to IEEE 802.11af). The number of wireless antennas in the access point 200a is not limited to three as illustrated in FIG. 2A, but may include any number of antennas.

The access point 200a may also include a bus for connecting the various components of the access point 200a together, as well as hardware and/or software interfaces to enable communication among the various components. The access point 200a may also include various other components not illustrated in FIG. 2A. For example, the access point 200a may include a number of input, output, and processing components such as buttons, lights, switches, antennas, display screen or touchscreen, various connection ports, additional processors or integrated circuits, and many other components.

Figure 2B:
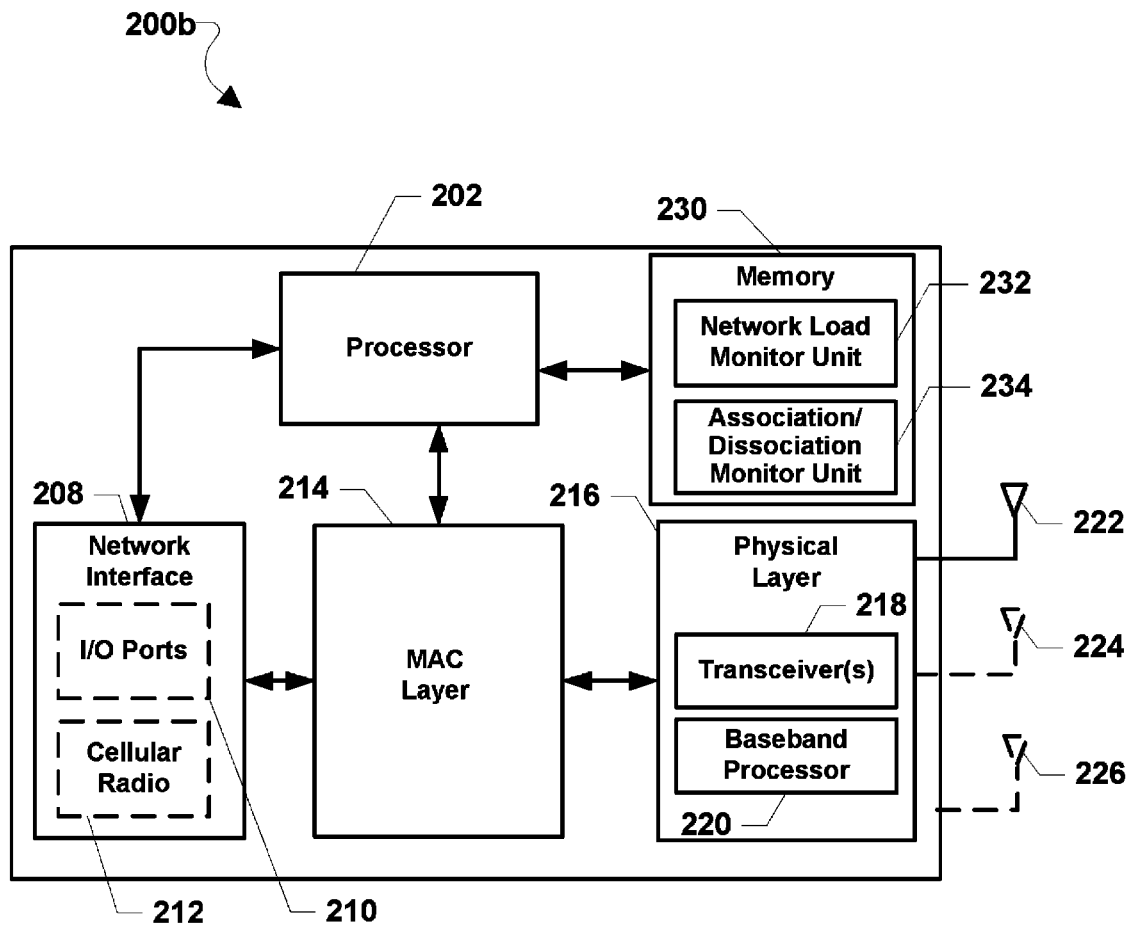

FIG. 2B is a component block diagram of another example of a wireless access point 200b suitable for implementing various embodiments. With reference to FIGS. 1-2B, in various embodiments, the access point 200b may be similar to the access point 108 and 200a. The access point 200b may include a memory 230 in which may be stored processor-executable instructions for a network load monitor unit 232, and an association/dissociation monitor unit 234. The network load monitor unit 232 may be stored processor-executable instructions configured to cause the processor 202 to perform functions similar to the network load monitor unit 206 described with reference to FIG. 2A. Similarly, the association/dissociation monitor unit 234 may be stored processor-executable instructions configured to cause the processor 202 to perform functions similar to the association/dissociation monitor unit 228 described with reference to FIG. 2A.

In some embodiments, the network load monitoring unit 206, 232 and the association/dissociation monitor unit 228, 234 may be implemented partially in hardware (as illustrated in FIG. 2A) and partially in software (as illustrated in FIG. 2B).

Figure 2C:
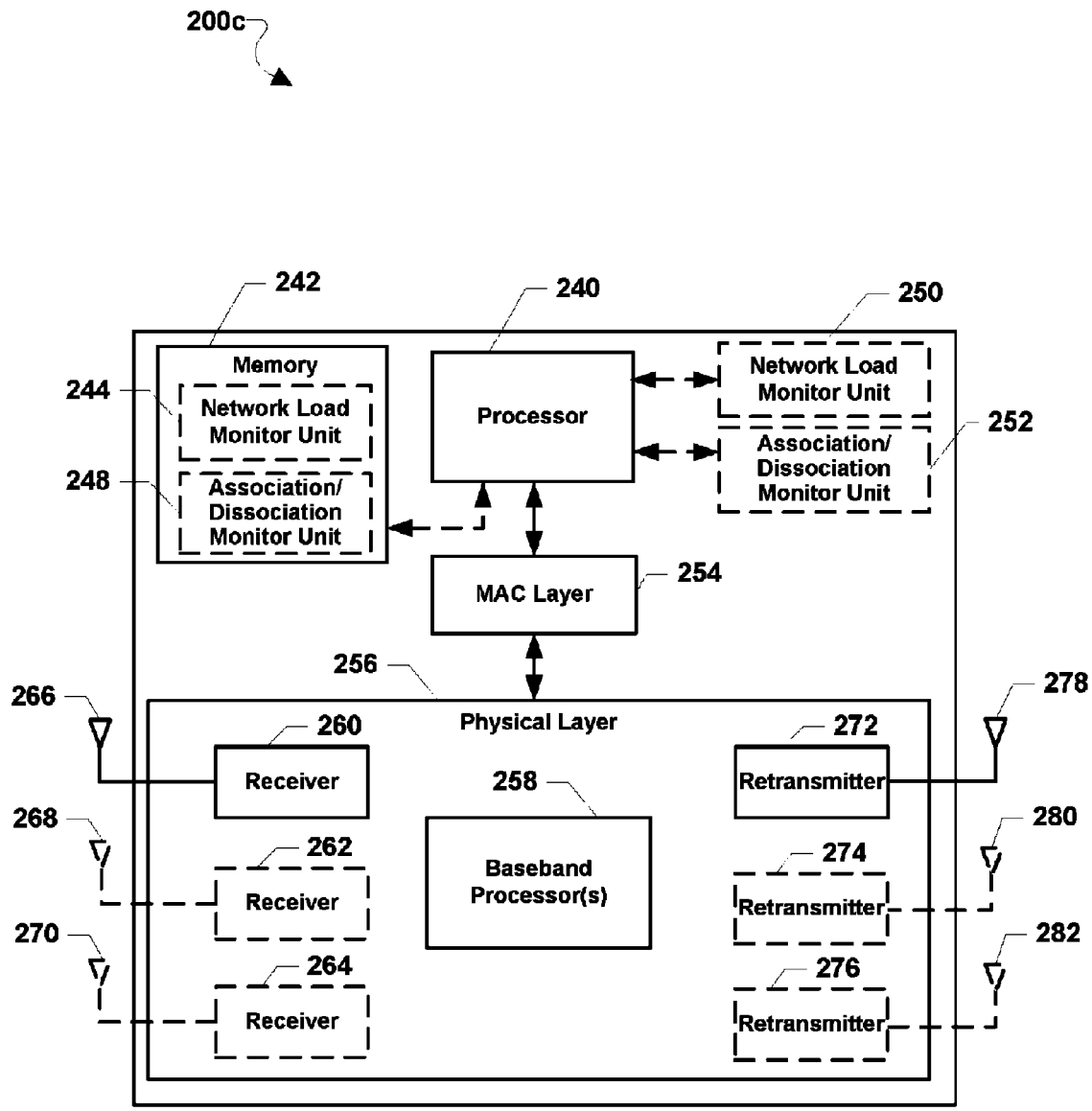
FIGS. 2C and 2D are component block diagrams illustrating range extenders suitable for use with various embodiments.

A special type of access point is a "range extender" that is configured to relay network message traffic via wireless communication links between an access point (e.g., 200a, 200b) and client devices beyond the wireless communication range of the access point. FIG. 2C is a component block diagram of an example of a range extender 200c suitable for implementing various embodiments. With reference to FIGS. 1-2C, the range extender includes components that may be found in similar types of access points, including signal relays, wireless repeaters, signal boosters, femto cells, and similar wireless devices. Typically, a range extender 200b may communicate and operate in conjunction with an access point 200a, 200b and function to extend the communication range of the access point 200a, 200b.

The range extender 200b may include at least one processor 240 that may be a general purpose processor configurable with processor-executable instructions to execute operations of the various embodiments, a specialized processor, such as a modem processor, configurable with processor-executable instructions to execute operations of the various embodiments in addition to a primary function, a dedicate hardware (i.e., "firmware") circuit configured to perform operations of the various embodiments, or a combination of dedicated hardware/firmware and a programmable processor.

The processor 240 may be coupled to a memory 242. The memory 242 may be a non-transitory computer-readable storage medium that stores processor-executable instructions. The memory 242 may store an operating system, as well as user application software and executable instructions. The memory 242 may also store application data, such as an array data structure. The memory 242 may include one or more caches, read only memory (ROM), random access memory (RAM), electrically erasable programmable ROM (EEPROM), static RAM (SRAM), dynamic RAM (DRAM), or other types of memory. The processor 240 may read and write information to and from the memory 242. The memory 242 may also store instructions associated with one or more protocol stacks. A protocol stack generally includes computer executable instructions to enable communication using a radio access protocol or communication protocol.

In some embodiments, a network load monitor unit 250, and an association/dissociation monitor unit 252 may be implemented in hardware as dedicated circuitry coupled to the processor 240. In some embodiments, the memory 242 may store processor-executable instructions for a network load monitoring unit 244 and an association/dissociation monitor unit 248 that may be executed in the processor 240. Thus, in various embodiments, the network load monitoring unit 244, 250 and the association/dissociation monitor unit 248, 252 may be implemented completely in software, completely in hardware, or partially in hardware and partially in software.

The processor 240 may be coupled to a MAC layer 254. The MAC layer 254 may provide addressing and channel access control mechanisms for coordinating communication links between wireless client devices connected to the range extender 200c and an access point (e.g., 108, 200a, 200b) with which the range extender 200c is associated.

The MAC layer 254 may be connected to a physical layer 256, which may perform various encoding, signaling, and data transmission and reception functions on the range extender 200c. The physical layer 256 may include one or more baseband processors 258 for controlling the operation of one or more receivers 260-264 and one or more retransmitters 272-276. The receivers 260-264 may each receive a broadband network connection signal transmitted from an access point. The receivers 260-264 may receive signals through one or more wireless antennas 266-270. Each receiver 260-264 may include one or more amplifiers, filters, radios, and other components for performing reception operations. Each receiver 260-264 may operate on a different base or center frequency. For example, the receivers 260-264 may receive signals on different frequencies utilized by the transceiver(s) 218 of the access point 200a, 200b.

In some embodiments, the baseband processor(s) 258 may control the operation of one or more retransmitters 272-276. Each retransmitter 272-276 may retransmit a broadband network connection signal from a receiver 260-264. Each retransmitter 272-276 may transmit the signal to one or more client devices through one or more wireless antennas 278-282. The frequencies utilized by each retransmitter 272-276 may be the same frequencies or different frequencies utilized by the receivers 260-264.

In some embodiments, the network load monitor unit 244, 250 may use information from receivers 260-264, and/or retransmitters 272-276, the baseband processor(s) 258, and/or the processor 240 to determine a network load of the access point caused by one or more associated client devices (e.g., the client devices 102, 104, 106). In some embodiments, the network load monitor unit 244, 250 may receive information from the receivers 260-264, and/or retransmitters 272-276, and may provide such information to the processor 240 for determination of the network load. In some embodiments, the association/dissociation monitor unit 248, 252 may use information from the receivers 260-264, and/or retransmitters 272-276, the baseband processor(s) 258, and/or the processor 240 to determine a number and/or identity of client devices that associate with or dissociate from the range extender 200b. In some embodiments, the association/dissociation monitor unit 248, 252 may receive information from the receivers 260-264, and/or retransmitters 272-276 and provide such information to the processor 240 for determination of the number and/or identity of client devices that associate with or dissociate from the range extender 200c. The network load monitor unit 244, 250, the association/dissociation monitor unit 248, 252, and/or the processor 240 may store information related to the network load and client associations and dissociations in the memory 242.

Each receiver 260-264 and each retransmitter 272-276 may include various circuitry and components to enable the sending, receiving, and processing of radio signals, such as a modulator/demodulator component, a power amplifier, a gain stage, a digital signal processor (DSP), signal amplifiers, a filter, and other such components. Each of the receivers 260-264 and the retransmitters 272-276 may be configured to provide communications using one or more frequency bands, for example 2.4 GHz, lower band 5 GHz, higher band 5 GHz, or another frequency band. The number of receivers 260-264 and retransmitters 272-276 in the range extender 200c is not limited to three as illustrated in FIG. 2C, but may include any number of receivers and/or retransmitters. In some embodiments, there may be a one-to-one correspondence between receivers and retransmitters. In some embodiments, multiple receivers may share one retransmitter, and/or multiple retransmitters may share one receiver.

In some embodiments, the receivers 260-264 may also be configured to receive communications from various client devices associated with the range extender 200c, and the retransmitters 272-276 may be configured to transmit the communications from the client devices to another access point (e.g., the access point 200a, 200b), which may be in communication with a communication network (e.g., the communication network 110). In other embodiments, the retransmitters 272-276 may be configured to receive communications from various client devices associated with the range extender 200c, and the receivers 260-264 may be configured to transmit the communications from the client devices to another access point (e.g., the access point 200a, 200b).

The range extender 200c may also include a bus for connecting the various components of the range extender 200c together, as well as hardware and/or software interfaces to enable communication among the various components. The range extender 200c may also include various other components not illustrated in FIG. 2C. For example, the range extender 200c may include a number of input, output, and processing components such as buttons, lights, switches, antennas, display screen or touchscreen, various connection ports, additional processors or integrated circuits, and many other components.

Figure 2D:
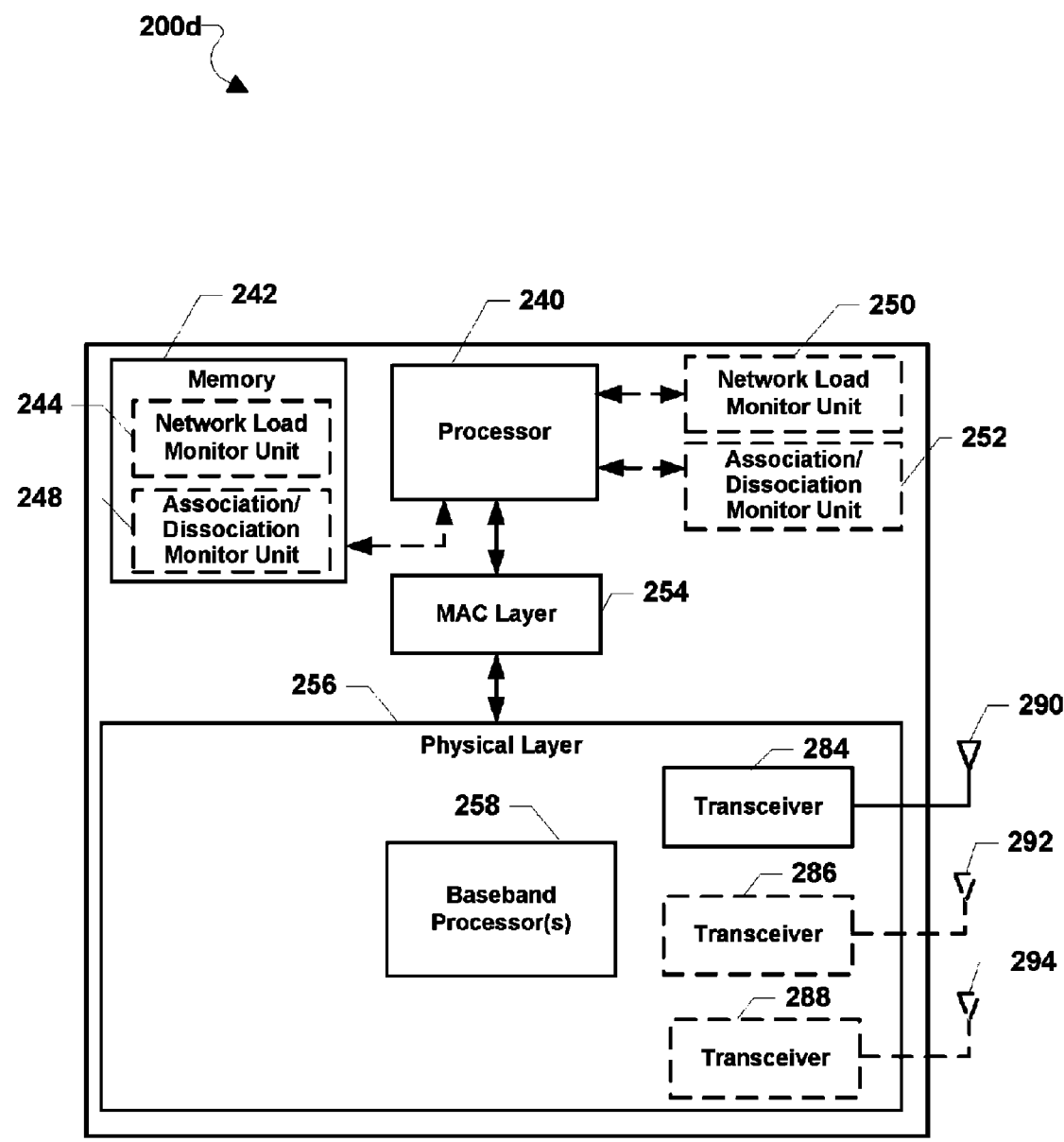

In some embodiments, the functions of the one or more receivers 260-264 may be combined with the functions of the one or more retransmitters 272-276 in transceivers 284-288 with both reception and transmission capabilities, as illustrated in FIG. 2D. For example, the transceivers 284-288 may be configured to receive communications from various client devices connected to the range extender 200d, as well as receive communications from an access point associated with the range extender 200d (e.g., through one or more wireless antennas 290-294). The transceivers 284-288 may also be configured to transmit communications received from the access point to the wireless client devices connected to the range extender 200d, and vice versa.

Since range extenders 200c, 200d and the like function as an access point to client devices and communicate via wireless links to an access point 200a, 200b, the various embodiments may be implemented in range extenders in a similar manner as with access points. Therefore, various embodiments will be described below using the term "access point" as a general term and an example of wireless communication devices suitable for implementing various embodiments. However, the following example embodiments and references to an "access point" are not intended to limit the scope of the claims to exclude range extenders (e.g., 200c, 200d) and similar devices that function as an access point for client devices and relay network communications to an access point (including in some cases another range extender).

Figure 3:
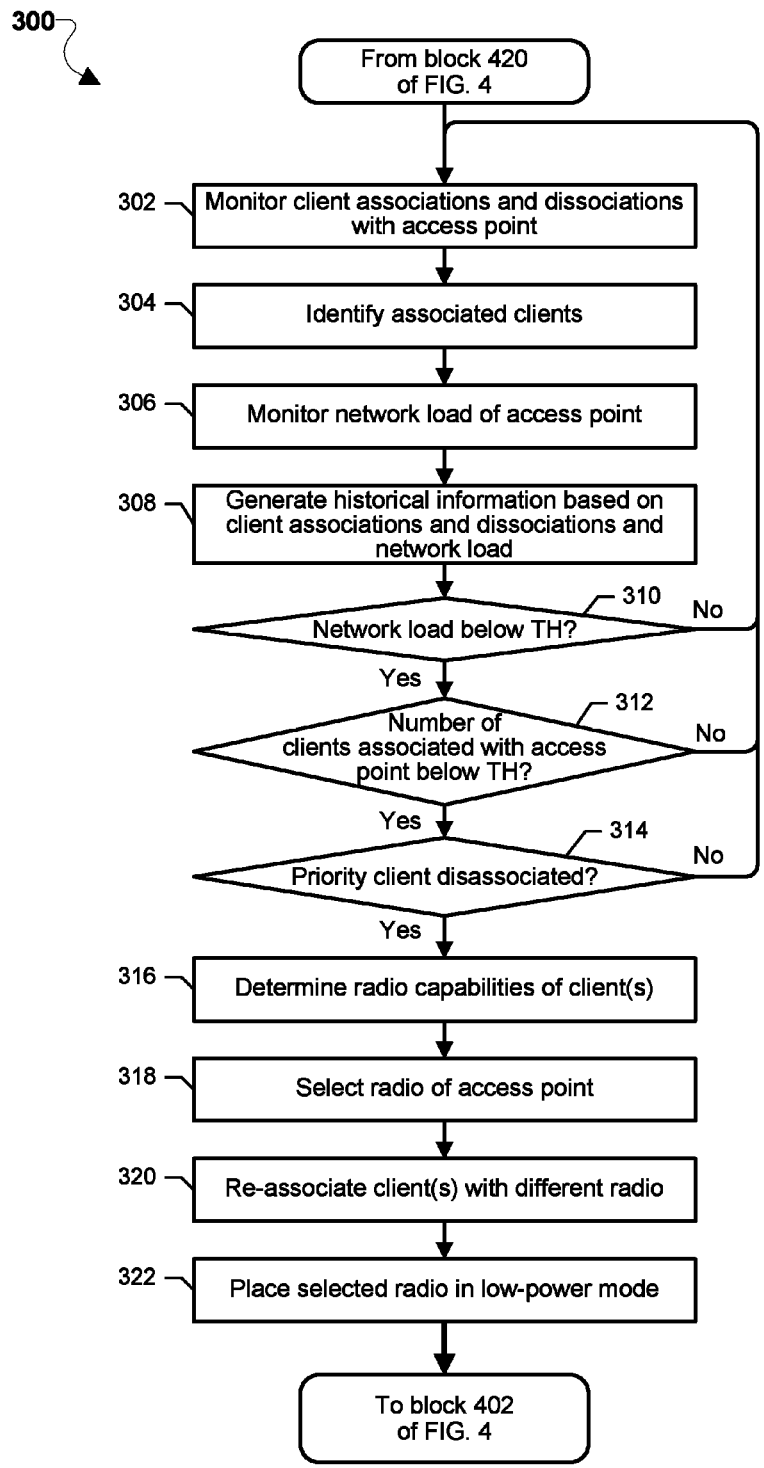
FIG. 3 is a process flow diagram illustrating a method for managing resource consumption by a wireless access point according to various embodiments.

FIG. 3 is a process flow diagram illustrating a method 300 for managing resource consumption by a wireless access point according to some embodiments. With reference to FIGS. 1-3, in various embodiments, the method 300 may be implemented by a processor (e.g., 202, 240) of an access point (e.g., 108, 200a, 200b, 200c, 200d).

In block 302, the processor of the access point (a "processor") may monitor associations and dissociations of one or more client devices (e.g., the client devices 102, 104, 106) with the access point. The processor may monitor client associations with a particular radio of the access point (e.g., a 2.4 GHz radio, a lower band 5 GHz radio, an upper band 5 GHz radio, or another specific radio of the access point).

In block 304, the processor may identify client devices that are associated with the access point. In some embodiments, the processor may determine a number of client devices that are associated with the access point. In some embodiments, the processor may also determine an identity of one or more client devices associated with the access point.

In block 306, the processor may monitor a network load of the access point. The network load may include, for example, an aggregate throughput of data through the access point from one or more associated client devices. The network load may also include an amount of time occupied by data traffic between the access point and the one or more associated client devices (for example, as a percentage of data carriage capacity, a number of utilized slots, a percentage of slot utilization, or another data carriage metric). The network load may also include an amount of time that one or more radios of the access point are transmitting or receiving a signal to or from a client. The network load may also include another network load metric, including portions or combinations of the foregoing. In some embodiments, the processor may monitor the network load on a per-radio basis, and may determine a portion of the overall network load that is associated with each radio of the access point.

In block 308, the processor may generate historical information based on the client associations and dissociations, and the network load. The historical information may also include identity use of one or more client devices, and may associate network load/utilization information and the timing of one or more associations and/or dissociations with the client identity. In some embodiments, based on the historical information the processor may assign a priority to a client, such as designating a frequently associated client as a priority client.

In determination block 310, the processor may determine whether the network load is below a load threshold.

In response to determining that the network load is below the load threshold (i.e., determination block 310="Yes"), the processor may determine whether a number of client devices associated with the access point is below a client number threshold in determination block 312. In some embodiments, the processor may determine whether a number of client devices associated with a radio of the access point is below the client threshold.

In response to determining that the number of client devices associated with the access point is below the client number threshold (i.e., determination block 312="Yes"), the processor may determine whether a priority client has disassociated from the access point in determination block 314.

In response to determining that the network load is not below the load threshold (i.e., determination block 310="No"), or that the number of client devices associated with the access point is not below the client number threshold (i.e., determination block 312="No"), or that a priority client has not dissociated from the access point (i.e., determination block 314="No"), the processor may continue to monitor client associations and dissociations with the access point in block 302.

In response to determining that a priority client has dissociated from the access point (i.e., determination block 314="Yes"), the processor may determine radio capabilities of client devices associated with the access point in block 316. Determining the radio capabilities of associated client devices may include determining channels/ radios of the access point on which each associated client is capable of communicating. For example, while the access point may include a variety of radios (e.g., one or more radios capable of communications using one or more frequency bands including 2.4 GHz, lower band 5 GHz radio, higher band 5 GHz, 900 MHz, 60 GHz, and one or more bands between 54 and 790 MHz), certain client devices may only support communications with one or two of the channel/carriers supported by the access point (e.g., the 2.4 GHz band, the lower 5 GHz band, and so forth). In some embodiments, the processor may determine the radio capabilities of the associated clients from information included in a message from each client. For example, a probe request and association request message, or another message from a client may include an information element that includes the client's radio capabilities (and/or band capabilities). As another example, the processor of the access point may send a query message to each associated client, and the processor may determine each client's radio capabilities based on information in a responsive message that the processor receives from each client.

Based on the determined capabilities of one or more client devices associated with the access point, the processor may select a radio of the access point to be placed in a low power mode in block 318. In some embodiments, the processor may select the radio of the access point based on a determination that a number of client devices associated with the access point is below the client threshold. In some embodiments, the processor may select the radio of the access point based on a determination that a number of client devices associated with a particular radio of the access point is below the client threshold. For example, the processor may select a lower band 5 GHz radio based on the network load of the access point, the number of client devices associated with the access point, and/or the dissociation of a priority client. The processor may also select the lower band 5 GHz radio based on the number of client devices associated with the lower band 5 GHz radio (as well as, for example, one or more other radios of the access point, e.g., a 2.4 GHz radio or an higher band 5 GHz radio).

In some embodiments, the processor may select the radio of the access point based on a determination that a priority client has disassociated from the access point. Further, the processor may select the radio of the access point based on a determination that the priority client has dissociated from a particular radio of the access point. The processor may also select the radio of the access point based on an identity of one or more client devices associated with the access point.

In some embodiments, the processor may select the radio of the access point based on the generated historical information of the one or more client devices (e.g., the historical information about associations and dissociations of client devices and/or the network load attributable to each client, currently and/or historically). For example, the processor may select the radio based on a portion of the network load attributable to each of the one or more client devices associated with the access point.

In block 320, the processor may re-associate client devices that are using the selected radio with a different radio of the access point. For example, the processor may select a lower band 5 GHz radio, and may instruct or request client devices using the lower band 5 GHz radio to use a different radio of the access point, such as a 2.4 GHz radio or a higher band 5 GHz radio. In some embodiments, the processor may send a dissociation instruction to each client using the selected radio. In such embodiments, the processor may further block (e.g., blacklist) each such client from the selected radio, for example to prevent immediate re-Association with the selected radio by such client devices. In some embodiments, the processor may send to each client using the selected radio a transition instruction, such as a BSS_transition_management message or another similar message.

When client devices have been redirected away from the selected radio, the processor may place the selected radio in a low-power mode in block 322. In some embodiments, the processor may place the selected radio in a sleep mode, an idle mode, or another similar low-power activity mode. In some embodiments, the processor may turn off or power down the selected radio. In some embodiments, the processor may place selected radio in a sleep mode, an idle mode, or another similar low-power activity mode for a predetermined period of time after which the processor may turn off or power down the selected radio unless it has been reactivated (e.g., in block 418 of the method 400 as described with reference to FIG. 4). In some embodiments, the processor may restrict activity of the selected radio below a threshold activity level.

In some embodiments, the processor may select and place into low power mode a radio of the access point that is being used for communications with another access point, such as a range extender type access point. For example, a range extender 200c, 200d may be in communication with an access point 200a, 200b. In some embodiments, a processor of the access point 200a, 200b (a "first" access point) may select a radio (e.g., one of the transceiver(s) 218) that is used to communicate with a range extender 200c, 200d (a "second" access point). In some embodiments, a processor of the range extender 200c, 200d may select a radio (e.g., one of the receivers 260-264) that is used to communicate with the access point 200a, 200b. For example, the access point 200a, 200b and the range extender 200c, 200d may use one or more of a 2.4 GHz radio and a 5 GHz radio for communication. The 2.4 GHz radio may provide a longer communication range between the access point 200a, 200b and the range extender 200c, 200d than the 5 GHz radio but with lower data carrying capacity. In some embodiments, the access point 200a, 200b and/or the range extender 200c, 200d may evaluate a communication link between the access points (such as for example a wireless backhaul communication link), and one or both of the access point 200a, 200b and the range extender 200c, 200d may determine that the communication link should be shifted to a lower power radio so that the higher power radio can be placed in a low power mode.

Figure 4:
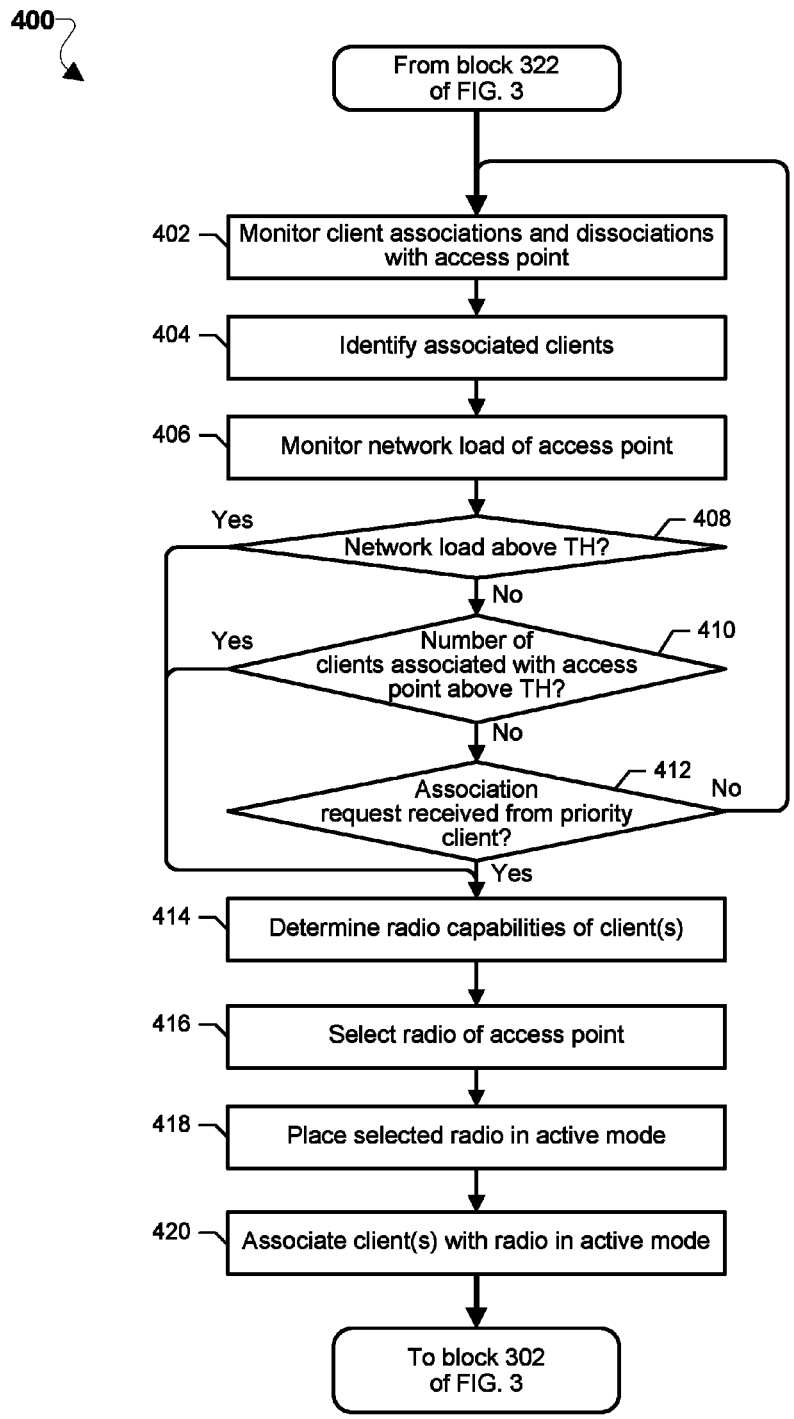
FIG. 4 is a process flow diagram illustrating a method for managing resource consumption by a wireless access point according to various embodiments.

After placing the selected radio in low power mode in block 322 of the method 300, the processor may continue managing resource consumption by the wireless access point in method 400 illustrated in FIG. 4 according to some embodiments. With reference to FIGS. 1-4, in various embodiments, the method 400 may be implemented by a processor (e.g., 202, 240) of an access point (e.g., 108, 200a, 200b, 200c, 200d).

In block 402, the processor of the access point may monitor associations and dissociations of one or more client devices with the access point. In block 404, the processor may identify client devices that are associated with the access point. In block 406, the processor may monitor a network load of the access point.

In determination block 408, the processor may determine whether the network load is above a load threshold.

In response to determining that the network load is not below the load threshold (i.e., determination block 408="No"), the processor may determine whether a number of client devices associated with the access point is above a client threshold in determination block 410. In some embodiments, the processor may determine whether a number of client devices associated with a radio of the access point is above the client threshold.

In response to determining that the number of client devices associated with the access point is not below the client threshold (i.e., determination block 410 ="No"), the processor may determine whether the access point has received an association request from a priority client in determination block 412. For example, the processor may determine that the access point has received a probe, a random access channel (RACH) request, an access request, or another similar message from a priority client requesting to associate with the access point.

In response to determining that the access point has not received an association request from a priority client (i.e., determination block 412="No"), the processor may continue monitoring client associations and dissociations with the access point in block 402.

In response to determining that the network load is above the load threshold (i.e., determination block 408="Yes"), or that the number of client devices associated with the access point is below the client threshold (i.e., determination block 410="Yes"), or that a priority client received an association request from a priority client (i.e., determination block 412="Yes"), the processor may determine radio capabilities of client devices associated with the access point in block 414. In some embodiments, determining the radio capabilities of client devices may also include determining radio capabilities of the priority client. In some embodiments, determining the radio capabilities of client devices may include determining radio capabilities of client devices expected to associate with the access point, for example, based on historical information about the access point such as historical client associations and dissociations and/or historical network load attributable to such client devices. In some embodiments, the processor may determine the radio capabilities of the associated clients from information included in a message from each client. For example, a probe request and association request message, or another message from a client may include an information element that includes the client's radio capabilities (and/or band capabilities). As another example, the processor of the access point may send a query message to each associated client, and the processor may determine each client's radio capabilities from a responsive message that the processor receives from each client.

Based on the determined capabilities of one or more client devices associated with the access point, the processor may select an access point radio to be activated in block 416. In some embodiments, the processor may select the radio of the access point based on the determination that a number of client devices associated with the access point is above the client threshold. In some embodiments, the processor may select the radio of the access point based on a determination that a number of client devices associated with a particular radio of the access point is above the client threshold. In some embodiments, the processor may select the radio of the access point based on the determination that the access point has received an association request from a priority client.

In some embodiments, the processor may select the radio of the access point based on the generated historical information of the one or more client devices (e.g., the historical information about associations and dissociations of client devices and/or the network load attributable to each client, currently and/or historically). For example, the processor may select the radio based on a determination that one or more client devices are expected to associate with the access point based on the historical information. Such historical information may relate to timing of the association such client devices and/or a network load attributable to such client devices.

In block 418, the processor may place the selected radio in an active mode. Placing the selected radio in the active mode may include powering up the radio and/or activating the radio from a low-power mode or idle mode.

In block 420, the processor may associate one or more client devices with the radio placed in the active mode. The processor may associate the one or more client devices with the radio based on the determined radio capabilities of one or more associated client devices. The processor may then monitor client associations and dissociations with the access point in block 302 of the method 300 (FIG. 3) for opportunities to place a radio back into an inactive or low power state.

In some embodiments, the processor may select an access point radio for activation to support communications with another access point. For example, a range extender 200c, 200d may be in communication with an access point 200a, 200b such that range extender 200c, 200d functions as a range extender of access point 200a, 200b. In some embodiments, a processor of a first access point (e.g., the access point 200a, 200b) may select a radio (e.g., one of the transceiver(s) 218) for communication with a second access point (e.g., the range extender 200c, 200d). In some embodiments, a processor of a second access point (e.g., the range extender 200c, 200d) may select a radio (e.g., one of the receivers 260-264) for communication with the first access point (e.g., the access point 200a, 200b). For example, the access point 200a, 200b and range extender 200c, 200d may use one or more of a 2.4 GHz radio and a 5 GHz radio for communication. A 2.4 GHz radio may provide a longer communication range and/or additional communication bandwidth between the access point 200a, 200b and the range extender 200c, 200d. Thus, in some embodiments, the access point 200a, 200b and/or the range extender 200c, 200d may evaluate a communication link between the access points (such as for example a wireless backhaul communication link), and one or both of the access point and the ranges may determine to migrate a communication link to a radio that may provide a longer range and/or additional bandwidth (e.g., from a 5 GHz radio to a 2.4 GHz radio).

Thus, the various embodiments may improve the function of a wireless access point by improving management of resource consumption. In particular, the various embodiments may improve the functioning of an access point by reducing power consumption and processing resource utilization of the access point. The various embodiments may improve the functioning of the access point by reducing interference generated by the access point with signals of other devices. Additionally, the various embodiments may improve the functioning of the access point with respect to regulatory compliance with power consumption and/or signal emission regulations in various jurisdictions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the method 300 may be substituted for or combined with one or more operations of the method 400 and vice versa.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A method of managing resource consumption by a wireless access point, comprising:
    monitoring associations and dissociations of one or more client devices with an access point;
    monitoring a network load of the access point;
    determining whether the network load is below a load threshold;
    determining radio capabilities of one or more client devices associated with the access point when the network load is below the load threshold;
    selecting a radio of the access point based on the determined radio capabilities of one or more client devices associated with the access point; and
    placing the selected radio of the access point in a low-power mode.

2. The method of claim 1, further comprising:
    determining whether a number of client devices associated with the access point is below a client threshold in response to determining that the network load is below the load threshold; and
    determining radio capabilities of the one or more client devices associated with the access point when the number of client devices associated with the access point is below the client threshold.

3. The method of claim 2, wherein determining whether a number of client devices associated with the access point is below a client threshold comprises determining whether a number of client devices associated with a radio of the access point is below a client threshold,
    wherein selecting a radio of the access point based on the determined radio capabilities of one or more client devices associated with the access point comprises selecting a radio of the access point based on the determined radio capabilities of one or more client devices associated with the access point when the number of client devices associated with the radio of the access point is below the client threshold.

4. The method of claim 2, further comprising:
    determining whether a priority client has dissociated from the access point in response to determining that the number of client devices associated with the access point is below the client threshold; and
    determining radio capabilities of the one or more client devices associated with the access point in response to determining that the priority client has dissociated from the access point.

5. The method of claim 1, further comprising identifying the one or more client devices associated with the access point,
wherein selecting a radio of the access point based on the determined radio capabilities of the one or more client devices associated with the access point comprises selecting the radio of the access point based on an identity of the one or more identified client devices associated with the access point.

6. The method of claim 1, further comprising generating historical information of the one or more client devices based on the monitored associations and dissociations of the one or more client devices with the access point,
wherein selecting a radio of the access point based on the determined radio capabilities of the one or more client devices associated with the access point comprises selecting the radio of the access point based on the generated historical information of the one or more client devices.

7. The method of claim 6, wherein the generated historical information of the one or more client devices comprises a portion of the network load attributable to the one or more client devices associated with the access point, and
wherein selecting a radio of the access point based on the determined radio capabilities of the one or more client devices associated with the access point comprises selecting the radio of the access point based on the network load attributable to each of the one or more client devices associated with the access point.

8. The method of claim 6, wherein selecting the radio of the access point based on the generated historical information of the one or more client devices comprises selecting the radio of the access point based on one or more client devices expected to associate with the access point.

9. The method of claim 8, wherein selecting the radio of the access point based on one or more client devices expected to associate with the access point comprises selecting the radio of the access point based on radio capabilities of the one or more client devices expected to associate with the access point.

10. The method of claim 1, further comprising;
re-associating one or more associated client devices using the selected radio of the access point with a different radio of the access point.

11. The method of claim 1, wherein placing the selected radio of the access point in the low-power mode comprises turning off the selected radio of the access point.

12. The method of claim 1, further comprising:
determining whether the network load is above the load threshold;
determining radio capabilities of the one or more client devices associated with the access point when the network load is above the load threshold;
selecting a radio of the access point based on the determined radio capabilities of the one or more client devices associated with the access point; and
placing the selected radio of the access point in an active mode.

13. The method of claim 12, wherein selecting a radio of the access point based on the determined radio capabilities of the one or more client devices associated with the access point comprises selecting the radio of the access point based on the determined radio capabilities of one or more client devices expected to associate with the access point.

14. The method of claim 12, further comprising:
determining whether a number of client devices associated with the access point is above a client threshold in response to determining that the network load is not above the load threshold; and
determining the radio capabilities of the one or more client devices associated with the access point when the number of client devices associated with the access point is above the client threshold.

15. The method of claim 14, further comprising:
determining whether the access point has received an association request from a priority client in response to determining that the number of client devices associated with the access point is not above the client threshold; and
determining the radio capabilities of the one or more client devices associated with the access point in response to determining that the access point has received the association request from the priority client.

16. The method of claim 12, further comprising:
associating one or more associated client devices with the radio placed in the active mode.

17. The method of claim 1, wherein determining radio capabilities of one or more client devices associated with the access point when the network load is below the load threshold comprises determining the radio capabilities of the one or more client devices based on information in a message received from the one or more client devices.

18. A wireless access point, comprising:
one or more radios; and
a processor coupled to the one or more radios and configured with processor-executable instructions to perform operations comprising:
monitoring associations and dissociations of one or more client devices with the access point;
monitoring a network load of the access point;
determining whether the network load is below a load threshold;
determining radio capabilities of one or more client devices associated with the access point when the network load is below the load threshold;
selecting a radio from among the one or more radios based on the determined radio capabilities of one or more client devices associated with the access point; and
placing the selected radio of the access point in a low-power mode.

19. The wireless access point of claim 18, wherein the processor is configured with processor-executable instructions to perform operations further comprising:
determining whether a number of client devices associated with the access point is below a client threshold in response to determining that the network load is below the load threshold; and
determining radio capabilities of the one or more client devices associated with the access point when the number of client devices associated with the access point is below the client threshold.

20. The wireless access point of claim 19, wherein the processor is configured with processor-executable instructions to perform operations such that determining whether a number of client devices associated with the access point is below a client threshold comprises determining whether a number of client devices associated with a radio of the access point is below a client threshold, and
wherein the processor is configured with processor-executable instructions to perform operations such that selecting a radio of the access point based on the determined radio capabilities of one or more client devices associated with the access point comprises selecting a radio of the access point based on the determined radio capabilities of one or more client devices associated with the access point when the number of client devices associated with the radio of the access point is below the client threshold.

21. The wireless access point of claim 19, wherein the processor is configured with processor-executable instructions to perform operations further comprising:
determining whether a priority client has dissociated from the access point in response to determining that the number of client devices associated with the access point is below the client threshold; and
determining radio capabilities of the one or more client devices associated with the access point in response to determining that the priority client has dissociated from the access point.

22. The wireless access point of claim 18, wherein the processor is configured with processor-executable instructions to perform operations further comprising identifying the one or more client devices associated with the access point,
wherein the processor is configured with processor-executable instructions to perform operations such that selecting a radio of the access point based on the determined radio capabilities of the one or more client devices associated with the access point comprises selecting the radio of the access point based on an identity of the one or more identified client devices associated with the access point.

23. The wireless access point of claim 18, wherein the processor is configured with processor-executable instructions to perform operations further comprising generating historical information of the one or more client devices based on the monitored associations and dissociations of the one or more client devices with the access point,
wherein the processor is configured with processor-executable instructions to perform operations such that selecting a radio of the access point based on the determined radio capabilities of the one or more client devices associated with the access point comprises selecting the radio of the access point based on the generated historical information of the one or more client devices.

24. The wireless access point of claim 23, wherein the generated historical information of the one or more client devices comprises a portion of the network load attributable to the one or more client devices associated with the access point, and
wherein the processor is configured with processor-executable instructions to perform operations such that selecting a radio of the access point based on the determined radio capabilities of the one or more client devices associated with the access point comprises selecting the radio of the access point based on the network load attributable to each of the one or more client devices associated with the access point.

25. The wireless access point of claim 23, wherein the processor is configured with processor-executable instructions to perform operations such that selecting the radio of the access point based on the generated historical information of the one or more client devices comprises selecting the radio of the access point based on one or more client devices expected to associate with the access point.

26. The wireless access point of claim 25, wherein the processor is configured with processor-executable instructions to perform operations such that selecting the radio of the access point based on one or more client devices expected to associate with the access point comprises selecting the radio of the access point based on radio capabilities of the one or more client devices expected to associate with the access point.

27. The wireless access point of claim 18, wherein the processor is configured with processor-executable instructions to perform operations further comprising;
re-associating one or more associated client devices using the selected radio of the access point with a different radio of the access point.

28. The wireless access point of claim 18, wherein the processor is configured with processor-executable instructions to perform operations such that placing the selected radio of the access point in the low-power mode comprises turning off the selected radio of the access point.

29. A wireless access point, comprising:
means for monitoring associations and dissociations of one or more client devices with an access point;
means for monitoring a network load of the access point;
means for determining whether the network load is below a load threshold;
means for determining radio capabilities of one or more client devices associated with the access point when the network load is below the load threshold;
means for selecting a radio of the access point based on the determined radio capabilities of one or more client devices associated with the access point; and
means for placing the selected radio of the access point in a low-power mode.

30. The wireless access point of claim 29, further comprising:
means for determining whether a number of client devices associated with the access point is below a client threshold in response to determining that the network load is below the load threshold; and
means for determining radio capabilities of the one or more client devices associated with the access point when the number of client devices associated with the access point is below the client threshold.

31. The wireless access point of claim 30, wherein means for determining whether a number of client devices associated with the access point is below a client threshold comprises means for determining whether a number of client devices associated with a radio of the access point is below a client threshold, and
wherein means for selecting a radio of the access point based on the determined radio capabilities of one or more client devices associated with the access point comprises means for selecting a radio of the access point based on the determined radio capabilities of one or more client devices associated with the access point when the number of client devices associated with the radio of the access point is below the client threshold.

32. The wireless access point of claim 31, further comprising:
means for determining whether a priority client has dissociated from the access point in response to determining that the number of client devices associated with the access point is below the client threshold; and
means for determining radio capabilities of the one or more client devices associated with the access point in response to determining that the priority client has dissociated from the access point.

33. The wireless access point of claim 29, further comprising means for identifying the one or more client devices associated with the access point, wherein means for selecting a radio of the access point based on the determined radio capabilities of the one or more client devices associated with the access point comprises means for selecting the radio of the access point based on an identity of the one or more identified client devices associated with the access point.

34. The wireless access point of claim 29, further comprising means for generating historical information of the one or more client devices based on the monitored associations and dissociations of the one or more client devices with the access point,
wherein means for selecting a radio of the access point based on the determined radio capabilities of the one or more client devices associated with the access point comprises means for selecting the radio of the access point based on the generated historical information of the one or more client devices.

35. The wireless access point of claim 34, wherein the generated historical information of the one or more client devices comprises a portion of the network load attributable to the one or more client devices associated with the access point, and
wherein means for selecting a radio of the access point based on the determined radio capabilities of the one or more client devices associated with the access point comprises means for selecting the radio of the access point based on the network load attributable to each of the one or more client devices associated with the access point.

36. The wireless access point of claim 34, wherein means for selecting the radio of the access point based on the generated historical information of the one or more client devices comprises means for selecting the radio of the access point based on one or more client devices expected to associate with the access point.

37. The wireless access point of claim 36, wherein means for selecting the radio of the access point based on one or more client devices expected to associate with the access point comprises means for selecting the radio of the access point based on radio capabilities of the one or more client devices expected to associate with the access point.

38. The wireless access point of claim 29, further comprising:
means for re-associating one or more associated client devices using the selected radio of the access point with a different radio of the access point.

39. The wireless access point of claim 29, wherein means for placing the selected radio of the access point in the low-power mode comprises means for turning off the selected radio of the access point.

40. A non-transitory processor-readable storage medium having stored thereon processor-executable instructions configured to cause a processor of a multimode communication device to perform operations for managing resource consumption by a wireless access point, comprising:
monitoring associations and dissociations of one or more client devices with an access point;
monitoring a network load of the access point;
determining whether the network load is below a load threshold;
determining radio capabilities of one or more client devices associated with the access point when the network load is below the load threshold;
selecting a radio of the access point based on the determined radio capabilities of one or more client devices associated with the access point; and
placing the selected radio of the access point in a low-power mode.

41. The non-transitory processor-readable storage medium of claim 40, wherein the stored processor-executable instructions are configured to cause the processor of the multimode communication device to perform operations further comprising:
determining whether a number of client devices associated with the access point is below a client threshold in response to determining that the network load is below the load threshold; and
determining radio capabilities of the one or more client devices associated with the access point when the number of client devices associated with the access point is below the client threshold.

42. The non-transitory processor-readable storage medium of claim 41, wherein the stored processor-executable instructions are configured to cause the processor of the multimode communication device to perform operations such that:
determining whether a number of client devices associated with the access point is below a client threshold comprises determining whether a number of client devices associated with a radio of the access point is below a client threshold, and
selecting a radio of the access point based on the determined radio capabilities of one or more client devices associated with the access point comprises selecting a radio of the access point based on the determined radio capabilities of one or more client devices associated with the access point when the number of client devices associated with the radio of the access point is below the client threshold.

43. The non-transitory processor-readable storage medium of claim 41, wherein the stored processor-executable instructions are configured to cause the processor of the multimode communication device to perform operations further comprising:
determining whether a priority client has dissociated from the access point in response to determining that the number of client devices associated with the access point is below the client threshold; and
determining radio capabilities of the one or more client devices associated with the access point in response to determining that the priority client has dissociated from the access point.

44. The non-transitory processor-readable storage medium of claim 40, wherein the stored processor-executable instructions are configured to cause the processor of the multimode communication device to perform operations further comprising identifying the one or more client devices associated with the access point, and
wherein the stored processor-executable instructions are configured to cause the processor of the multimode communication device to perform operations such that selecting a radio of the access point based on the determined radio capabilities of the one or more client devices associated with the access point comprises selecting the radio of the access point based on an identity of the one or more identified client devices associated with the access point.

45. The non-transitory processor-readable storage medium of claim 40, wherein the stored processor-executable instructions are configured to cause the processor of the multimode communication device to perform operations further comprising generating historical information of the one or more client devices based on the monitored associations and dissociations of the one or more client devices with the access point,
> wherein the stored processor-executable instructions are configured to cause the processor of the multimode communication device to perform operations such that selecting a radio of the access point based on the determined radio capabilities of the one or more client devices associated with the access point comprises selecting the radio of the access point based on the generated historical information of the one or more client devices.

46. The non-transitory processor-readable storage medium of claim 45, wherein the generated historical information of the one or more client devices comprises a portion of the network load attributable to the one or more client devices associated with the access point, and
> wherein the stored processor-executable instructions are configured to cause the processor of the multimode communication device to perform operations such that selecting a radio of the access point based on the determined radio capabilities of the one or more client devices associated with the access point comprises selecting the radio of the access point based on the network load attributable to each of the one or more client devices associated with the access point.

47. The non-transitory processor-readable storage medium of claim 45, wherein the stored processor-executable instructions are configured to cause the processor of the multimode communication device to perform operations such that selecting the radio of the access point based on the generated historical information of the one or more client devices comprises selecting the radio of the access point based on one or more client devices expected to associate with the access point.

48. The non-transitory processor-readable storage medium of claim 47, wherein the stored processor-executable instructions are configured to cause the processor of the multimode communication device to perform operations such that selecting the radio of the access point based on one or more client devices expected to associate with the access point comprises selecting the radio of the access point based on radio capabilities of the one or more client devices expected to associate with the access point.

49. The non-transitory processor-readable storage medium of claim 40, wherein the stored processor-executable instructions are configured to cause the processor of the multimode communication device to perform operations further comprising;
> re-associating one or more associated client devices using the selected radio of the access point with a different radio of the access point.

50. The non-transitory processor-readable storage medium of claim 40, wherein the stored processor-executable instructions are configured to cause the processor of the multimode communication device to perform operations such that placing the selected radio of the access point in the low-power mode comprises turning off the selected radio of the access point.

* * * * *